United States Patent Office 3,444,287
Patented May 13, 1969

3,444,287
PROCESS FOR PREPARING PELLETS FROM SODIUM TRICHLORACETATE WHICH DO NOT AGGLOMERATE
Hans Kolb, Gersthofen, near Augsburg, Rudolf Hartmann, Augsburg, and Harald Buckmiller, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Original application May 9, 1963, Ser. No. 280,496. Divided and this application July 27, 1966, Ser. No. 576,166
Claims priority, application Germany, May 19, 1962, F 36,851
Int. Cl. B29j 1/00
U.S. Cl. 264—109    4 Claims

ABSTRACT OF THE DISCLOSURE

Pulverulent sodium trichloroacetate containing about 1 to 3% by weight, preferably 1.5 to 2.5% by weight, of water is molded under high pressure into pellets which are thereafter cooled in a current of air to a temperature below 30° C. to produce solid pellets having a small surface.

---

This application is a divisional of application Ser. No. 280,496 filed May 9, 1963 in the names of the instant inventors and now abandoned.

The present invention relates to a process for preparing pellets from sodium trichloracetate which do not agglomerate.

When sodium trichloracetate is prepared it is obtained in the form of a finely crystalline powder which even after drying at a high temperature tends to agglomerate. These properties are very inconvenient with regard to the manipulation of the product. Attempts have already been made to confer to the product a more manageable form, for example by scaling it.

Now we have found a process for preparing pellets of sodium trichloracetate which do not agglomerate. According to the process of the invention pulverulent sodium trichloracetate containing about 1 to 3% by weight, preferably 1.5 to 2.5% by weight, of water is molded under high pressure into pellets which are subsequently cooled in a current of air to a temperature below 30° C. In this way particularly solid pellets having a small surface are obtained.

The compression is brought about in an appropriate apparatus. It is advantageous to press the moist material through an apparatus in which perforated gear wheels mesh with one another and move in opposite directions. The pressure to be applied is suitably not below 50 atmospheres and advantageously not below 75 atmospheres. An upper limit of the range of pressure to be applied does in principle not exist although in general the desired effect is no longer increased when a pressure above about 100 atmospheres is applied. By the heat set free during the compression the sodium trichloracetate is dried to a large extent.

The shaping can be facilitated by the addition of appropriate solid or liquid lubricants. As examples of such lubricants talcum and ethylene glycol may be mentioned. The lubricants are suitably added to the trichloracetate before it is shaped. The quantity of ethylene glycol added should not exceed 1%. Sodium dichloracetate and dichloracetic acid may also be used as lubricants. They are either added to the pulverulent sodium trichloracetate prior to the compression or they are present from the beginning as secondary constituents in the sodium trichloracetate which has been shaped. The content of water allowed to remain in the material to be shaped also acts as a lubricant.

The cooling of the pellets may be brought about in cooling elements arranged after the molding device, for example air-cooled sieve cloths or vibration coolers.

The pellets obtained in the manner described above have a content of residual water of at most about 1% by weight. They have a high mechanical strength, do not exhibit any tendency to agglomerate and flow freely even after having been stored for a prolonged period. Moreover, their tendency to affect the human skin is considerably smaller than that of pulverulent sodium trichloracetate, and this is particularly favorable when the pellets are used as herbicide powder.

The following example serves to illustrate the invention but it is not intended to limit it thereto.

EXAMPLE 750 kilograms of pulverulent sodium trichloracetate having an average content of 94% by weight of sodium trichloracetate, 2% by weight of sodium dichloracetate and 2.5% by weight of water were molded under a pressure of about 75 atmospheres to form small cylinders, the compression being carried out in an automatic molding apparatus in which the moist material was pressed through perforated gear wheels moving in opposite directions. During this operation the temperature rose to 80° to 90° C. The pellets leaving the automatic apparatus were cooled with air to 28° C. on a wire-cloth cooler and filled into barrels.

The powder forming during this process was eliminated by means of cyclones, mixed with fresh moist pulverulent sodium trichloracetate and again subjected to the molding process. The quantity of sodium trichloracetate that had been shaped after having once passed through the apparatus amounted to 715 kilograms and contained 0.9% of water.

We claim:
1. A process for preparing pellets of sodium trichloroacetate which do not agglomerate comprising molding pulverulent sodium trichloroacetate containing about 1 to 3% by weight of water under a pressure of at least 50 atmospheres to form pellets whereby the water content of the sodium trichloroacetate is reduced during molding to below 1% by weight and cooling the resulting pellets in a current of air to a temperature below 30° C.

2. A process as claimed in claim 1, wherein the pulverulent sodium trichloracetate contains 1.5 to 2.5% by weight of water.

3. A process as claimed in claim 1, wherein the compression is brought about under a pressure of above 75 atmospheres.

4. A process as claimed in claim 1 wherein the sodium trichloroacetate is molded in an apparatus in which perforated gear wheels mesh with one another and move in opposite direction.

References Cited

UNITED STATES PATENTS

| 2,623,243 | 11/1952 | Jean et al. | 264—109 |
| 3,043,873 | 7/1962 | Peto et al. | 260—539 |

FOREIGN PATENTS

| 706,440 | 3/1954 | Great Britain. |

ROBERT F. WHITE, *Primary Examiner.*

J. R. HALL, *Assistant Examiner.*

U.S. Cl. X.R.

106—187; 264—41, 216